2½ D MEMORY

INVENTOR.
DALE L. FAUSETT
BY
Ronald W. O'Keefe
ATTORNEY

United States Patent Office 3,550,100
Patented Dec. 22, 1970

3,550,100

INFORMATION STORAGE CONTROL APPARATUS FOR A MAGNETIC CORE MEMORY

Dale L. Fausett, Phoenix, Ariz., assignor to General Electric Company, a corporation of New York Filed Apr. 30, 1968, Ser. No. 725,448
Int. Cl. G11c *5/02*
U.S. Cl. 340—174 7 Claims

ABSTRACT OF THE DISCLOSURE

A coincident current magnetic core memory using word and bit address lines for addressing memory storage locations. Transformer-coupled data switches associated with the bit address lines are arranged to minimize the duty cycle of the coupling transformers.

FIELD OF THE INVENTION

This invention relates to storage devices for computer systems and, in particular, to magnetic core memory systems. Specifically, this invention relates to a data switch arrangement for use in a 2½D magnetic core memory.

BACKGROUND OF THE INVENTION

In a conventional magnetic core memory, a memory cycle consists of a read or clear half-cycle followed by a restore or write half-cycle respectively. In one type of coincident-current magnetic core memory called a 2½D memory, data switches are employed during half-cycles of a complete memory cycle. During the read or clear half-cycle, the data switches cause drive current to flow through the bit address lines associated with the magnetic cores of the memory storage location addressed by the bit selection switches, this drive current flow in conjunction with the drive current flow through the word address line associated with magnetic cores of the memory storage location addressed by the word selection switches being sufficient to change the direction of magnetic flux in the addressed cores. During the restore or write half-cycle, the data switches are employed to control the storage of either binary 1's or binary 0's in the addressed magnetic cores by controlling drive current flow through the appropriate bit address lines in accordance with the binary digits to be stored. In contrast, in a 4-wire coincident-current memory or 3D memory, data switches, often termed inhibit drivers, are employed only during the restore or write half-cycle of the memory cycle. Similarly, in a linear selector 2D memory, the data switches are employed only during the restore or write half-cycle of the memory cycle.

The data switches in a 2½D memory often comprise transistor switches with the input or logic driver circuits of the switches being transformer coupled to the switches. DC coupling between the logic driver circuits and the data switches is sometimes used but is more expensive and has greater power requirements. Conventional transformer-coupled data switches are normally non-conductive or open and are driven to conduction or closed during appropriate portions of a memory cycle. Because the data switch must be closed during the read or clear half-cycle and may also be driven closed during the restore or write half-cycle, depending upon the binary digit to be stored, each data switch may be driven on twice during a single memory cycle, placing a duty cycle requirement as high as 80 percent to 90 percent on the coupling transformed. Continuous long-term operation of the coupling transformer at such a high duty cycle is impractical and not feasible. Coupling transformer recovery may be aided by special recovery circuits; however, such circuits increase the memory cost. Accordingly, it is desirable to provide a practical transformer-coupled data switch arrangement in a 2½D memory system.

It is therefore an object of this invention to provide an improved drive current arrangement in a 2½D memory system.

It is another object of this invention to provide an improved transformer-coupled data switch arrangement in a 2½D memory system.

It is a further object of this invention to provide a transformer-coupled data switch arrangement with maximum coupling transformer duty cycle of 50 percent.

It is a further object of this invention to provide a more efficient transformer-coupled data switch arrangement for providing drive currents in a magnetic core memory.

SUMMARY OF THE INVENTION

The foregoing objects are achieved, in accordance with the illustrated embodiment of the invention, by providing data switches associated with the bit address lines of a 2½D memory which are normally in the conductive or closed condition during both half-cycles of a memory cycle. The logic driver circuit associated with each data switch is transformer coupled to the data switch, each logic driver circuit being responsive to the state of a corresponding flip-flop of the memory data register. During the restore or write half-cycle of a memory cycle, the data switch remains in the closed condition if a binary 1 is to be stored in the associated bit position of the addressed word, as indicated by the contents of the corresponding memory data register flip-flop. The data switch is driven to a non-conductive or open condition only if the binary digit to be stored in the associated bit position of the addressed word is a binary 0.

BRIEF DESCRIPTION OF THE DRAWINGS

The subject matter of the invention is particularly pointed out and distinctly claimed in the concluding portion or this specification. The invention, however, both as to organization and method of operation may best be understood by reference to the following description taken in connection with the accompanying drawings, in which:

DESCRIPTION OF THE PREFERRED EMBODIMENT

Figure 1:
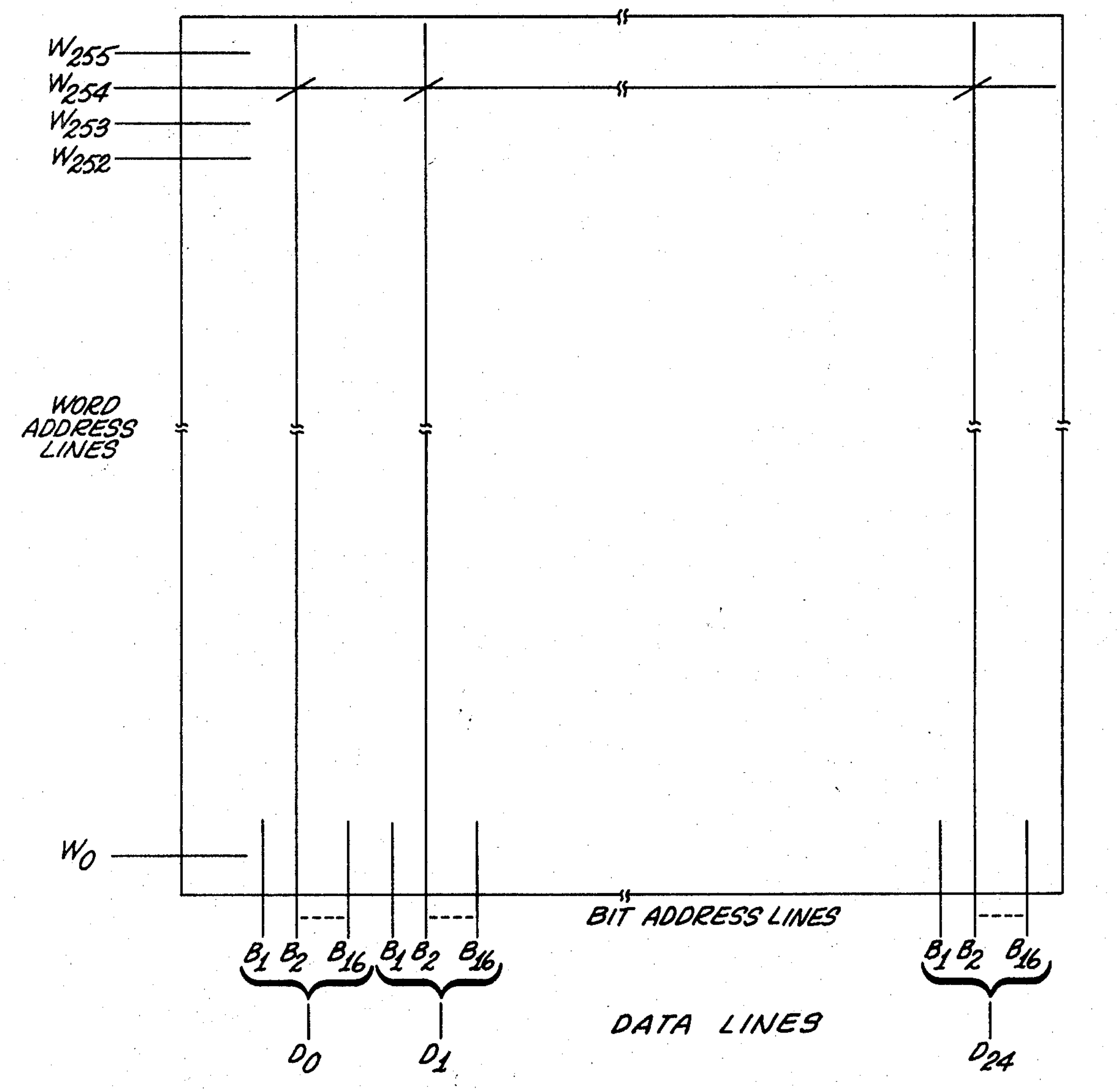
FIG. 1 illustrates diagrammatically the organization of a 2½D memory.

FIG. 1 illustrates the organization of a typical coincident current 2½D magnetic core memory. Referring to FIG. 1, the memory comprises an array of magnetic cores in a single plane. Word address lines extend along one dimension of the memory and pass through corresponding rows of magnetic cores in that dimension. In the illustrated memory, 256 word address lines, designated $W_0$–$W_{255}$, are provided. A courrent having a value equal to one-half that required to change the direction of flux in a magnetic core or "switch" the core is provided in a selected one of the word address lines during both the read or clear and the restore or write half-cycles of a complete memory cycle.

Bit address lines are provided which extend along the other dimension of the magnetic core plane orthogonal to the word address lines, as illustrated in FIG. 1, and pass through corresponding columns of magnetic cores in that dimension. The bit address lines are associated in groups of sixteen, the consecutive bit address lines of each group being designated $B_1$–$B_{16}$. In the illustrated memory system, twenty-five groups of sixteen consecutive bit address lines are provided, a data line being associated with each group. The twenty-five data lines are designated $D_0$–$D_{24}$.

A magnetic core is provided at each intersection of a word address line and a bit address line, the address lines passing through the core. The illustrated memory thus contains 256 x 16 x 25 or 102.400 magnetic cores. A sense line, not shown, passes through all the cores associated with each group of sixteen bit address lines, the signals appearing on the twenty-five sense lines during a read half-cycle representing the bits of a word stored in the addressed memory storage location.

At data word in the 2½D memory illustrated in FIG. 1 comprises twenty-five bits. Thus, in the second dimension of the memory, provision is made for selecting one of sixteen word locations while in the first dimension provision is made for selecting one of two-hundred fifty-six word locations. The illustrated memory thus has a storage capacity of 4,096 words. Twenty-five magnetic cores comprising one of the 4,096 memory storage locations are selected by selecting one of the word address lines $W_0$–$W_{255}$ and one of sixteen sets $B_1$–$B_{16}$ of twenty-five bit address lines. Selection of the word address lines and bit address lines is accomplished by means of selection switches, as known in the art.

During the read or clear half-cycle of a memory cycle, drive currents are provided through one word address line and through each of the data lines $D_0$–$D_{24}$ for application to twenty-five of the bit address lines, i.e. through one bit address line of each group. During the restore or write half-cycle of a memory cycle, currents are provided through one word address line and also through those data lines, and through the appropriate bit address lines of the associated groups, corresponding to the bit positions in which binary 1's are to be stored. Drive current flow is inhibited to those data lines, and in the appropriate bit address lines of the associated groups, corresponding to the bit positions in which binary 0's are to be stored.

Figure 2:
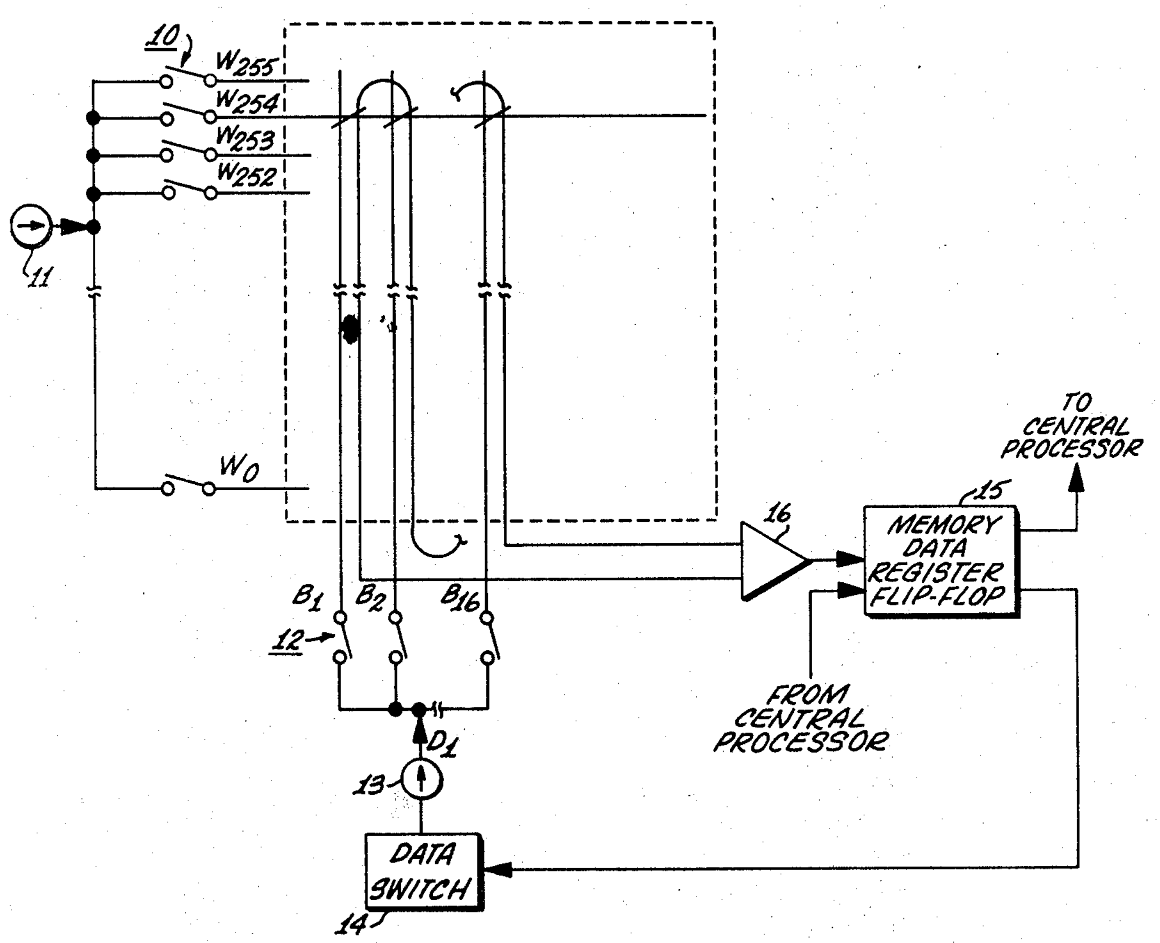
FIG. 2 illustrates the data switch arrangement of the invention in a 2½D memory.

FIG. 2 illustrates the organization of the memory of FIG. 1 relative to one of the twenty-five groups of sixteen bit address lines. Referring to FIG. 2, selection of one word address lines $W_0$–$W_{255}$ is accomplished by actuation of one of selection switches 10. Current source 11 provides current flow through the actuated address selection switch and the corresponding word address line. Similarly, selection of one of the sixteen bit address lines $B_1$–$B_{16}$ of a group is accomplished by actuation of one of selection switches 12. Current flow is provided through the actuated selection switch and the corresponding bit address line from current source 13 through the appropriate data line, for example data line $D_1$, if data switch 14 is closed. If data switch 14 is open, no current flows from current source 13 through data line $D_1$, the actuated selection switch and the associated bit address line.

The condition of data switch 14, during the restore or write half-cycle of a memory cycle, is controlled by the contents of memory data register flip-flop 15, as illustrated in FIG. 2. Specifically, if memory data register flip-flop 15 stores a binary 1, data switch 14 is rendered conductive or closed in response to the output of flip-flop 15. Conversely, if memory data register flip-flop stores a binary 0, data switch 14 is rendered non-conductive or open in response to the output signal of flip-flop 15.

The contents of memory data register flip-flop 15 are controlled by either the output of sense amplifier 16 or by a signal received from an appropriate register of the central processor. For example, during the read half-cycle of a read-restore memory cycle, the binary digit stored in the bit position of the addressed memory storage location corresponding to data line $D_1$ is supplied to sense amplifier 16 and stored in memory data register flip-flop 15. During the subsequent restore half-cycle, the binary digit in flip-flop 15 controls the conductivity state of data switch 14 so that the binary digit is restored to the corresponding bit position of the storage location for future use. In conjunction with a clear-write memory cycle, memory data register flip-flop 15 stores a binary digit received from the central processor and the magnetic core of the addressed storage location corresponding to data line $D_1$ is cleared during the clear half-cycle. During the write half-cycle, the binary digit in flip-flop 15 controls the conductivity state of data switch 14 to store the binary digit in the appropriate bit position of the addressed memory storage location.

In accordance with the invention, data switch 14 is arranged so that it is normally closed. In the closed condition, data switch 14 causes current source 13 to provide current flow through the bit address line corresponding to the actuated selection switch 12. Data switch 14 is opened only when a binary 0 is to be stored in the corresponding bit position of the addressed storage location during the restore or write half-cycle of a memory cycle. The opening of data switch 14 during a restore or write half-cycle is controlled by the contents of memory data register flip-flop 15.

Data switch 14 includes a transformer coupling arrangement for receiving the output signal of memory data register flip-flop 15. In accordance with the invention, a flux change in the coupling transformer only occurs during the restore or write half-cycle of a memory cycle and then only if a binary 0 is to be stored in the corresponding bit position of the addressed storage location. The maximum duty cycle of the coupling transformer is therefore fifty percent. The flux changes experienced in the coupling transformer during the read or clear and the restore or write half-cycles of a memory cycle are as illustrated below:

| | Read or clear half-cycle | Restore or write half-cycle |
|---|---|---|
| Binary digit: | | |
| 0 | No flux change | Flux change. |
| 1 | No flux change | No flux change. |

In contrast to the above, the following table indicates the flux changes which occur in the coupling transformer in prior art arrangements:

| | Read or clear half-cycle | Restore or write half-cycle |
|---|---|---|
| Binary digit: | | |
| 0 | Flux change | No flux change. |
| 1 | Flux change | Flux change. |

Figure 3:
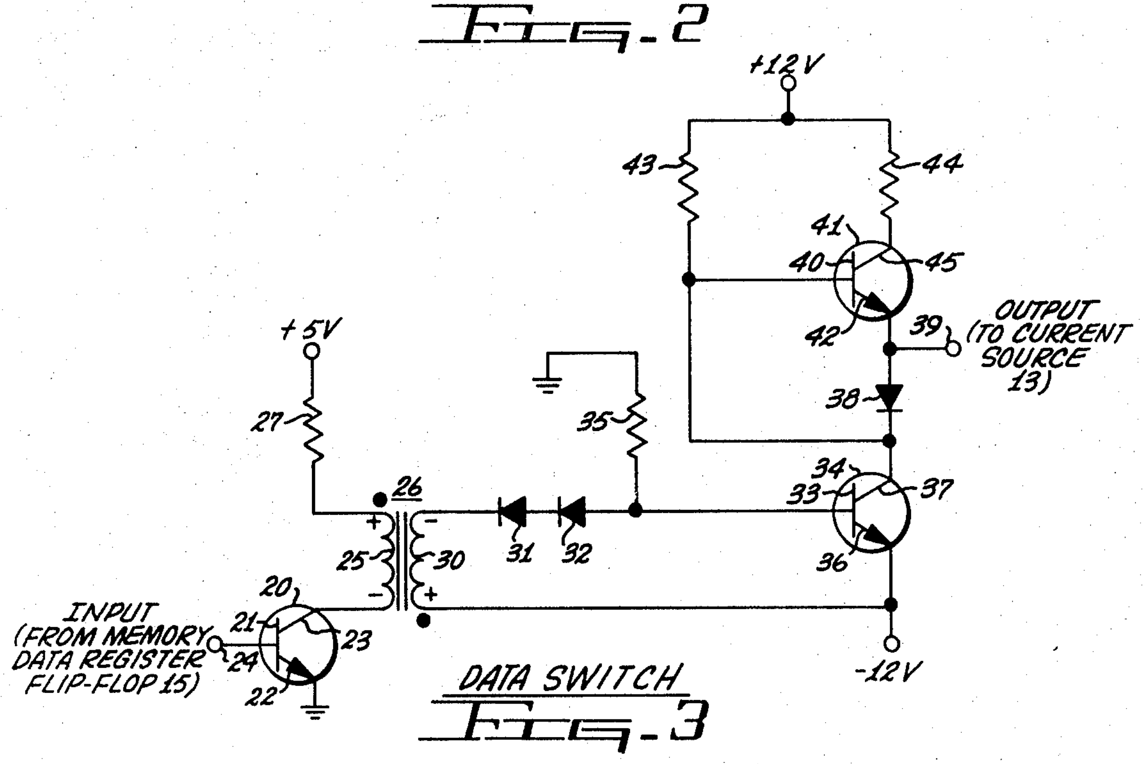
FIG. 3 is a circuit diagram illustrating the data switch circuit employed in the memory system of FIG. 2.

FIG. 3 illustrates the data switch circuit employed in the arrangement of FIG. 2. Referring to FIG. 3, the logic driver of the data switch comprises transistor 20, an NPN type transistor having base electrode 21, emitter electrode 22 and collector electrode 23. Base electrode 21 of transistor 20 is connected to an input terminal 24 which receives the output signal of the appropriate memory data register flip-flop 15. Emitter electrode 22 is connected to ground while collector electrode 23 is connected to one terminal of the primary winding 25 of transformer 26. Resistor 27 is connected between the other terminal of primary winding 25 and a source of positive potential, as illustrated in FIG. 3. Transformer 26 couples the output signal of memory data register flip-flop 15 to the data switch.

One terminal of the secondary winding 30 of coupling transformer 26 is connected to a source of negative potential, as illustrated, while the other terminal of secondary winding 30 is connected to the cathode electrode of diode 31. Primary winding 25 and secondary winding 30 of coupling transformer 26 are of opposite polarity, as indicated. The anode electrode of diode 31 is connected to the cathode electrode of diode 32, the anode electrode of diode 32 being connected to base electrode 33 of transistor 34. Resistor 35 is also connected between the anode electrode of diode 32 and ground.

Emitter electrode 36 of transistor 34 is connected to the source of negative potential, as shown. Collector electrode 37 of transistor 34 is connected to the cathode electrode of diode 38 and also to base electrode 40 of transistor 41. The anode electrode of diode 38 is connected to emitter electrode 42 of transistor 41. Resistors 43 and 44 are connected between base electrode 40 and emitter electrode 45 respectively of transistor 41 and a source of positive potential. Emitter electrode 42 of transistor 41 is also connected to output terminal 39 which provides the data switch output signal to current source 13.

In operation, transistor 20 is normally nonconductive and is rendered conductive when the output signal of memory data register flip-flop 15 is positive, indicating the storage of a binary 0 in flip-flop 15. Transistor 34 is normally conductive, being forward biased by the potential applied to base electrode 33 through resistor 35. Transistor 41 is normally non-conductive when transistor 34 is conductive. Thus, in the absence of an input signal to transistor 20, transistor 20 is non-conductive, transistor 34 is conductive and transistor 41 is non-conductive. The output signal at output terminal 39 is therefore negative, (approximately −11.1 volts), causing current source 13 to provide current flow through the bit address line corresponding to the actuated bit selection switch of the associated group.

In response to a positive output signal from memory data register flip-flop 15, representing the storage of a binary 0 in flip-flop 15, applied to input terminal 24, transistor 23 becomes conductive, causing a potential of indicated polarity to be impressed across primary winding 25 of coupling transformer 26. The resulting potential of indicated polarity across secondary winding 30 of coupling transformer 26 is applied through diodes 31 and 32 between base electrode 33 and emitter electrode 36 of transistor 34, reverse biasing transistor 34 to render it non-conductive. The resultant positive signal at the base electrode 40 of transistor 41 renders transistor 41 conductive, providing a positive output signal (approximately +11.7 volts) at output terminal 39. This output signal at output terminal 39 causes generation of a current by current source 13 to be inhibited. Appropriate circuits (not shown), as known in the art, are provided to set the associated memory data register flip-flop 15 to the binary 1 state after each restore or write half-cycle of a memory cycle.

The data switch thus normally causes the current source to provide current flow through the bit address line of the associated group corresponding to the actuated bit selection switch during both the first (read or clear) and the second (restore or write) half-cycles of a complete memory cycle. The data switch is actuated to inhibit the generation of a current by the associated current source only if a binary 0 is to be written into the bit position of the addressed storage location corresponding to the bit address line group during the restore or write half-cycle of a memory cycle. The coupling transformer which is responsive to the contents of the associated memory data register flip-flop and which actuates the data switch thus experiences a maximum of one flux change per memory cycle. At least one-half memory cycle is thus provided between each flux change to permit the coupling transformer to recover and no special recovery circuits are required. The advantages of AC or transformer coupling are obtained.

Accordingly, there has been described herein a computer memory apparatus embodying the instant invention. Although the principles of the invention have been made clear in an illustrative embodiment, there will be immediately obvious to those skilled in the art many modifications in structure, arrangements, proportions, elements, materials and components needed in the practice of the invention and otherwise, which are particularly adapted for specific environments and operating requirements. The appended claims are therefore intended to cover and embrace any such modifications, within the limits only of the true spirit and scope of the invention.

I claim:

1. A bit drive current control system for a 2½D memory comprising:

a data switch associated with each group of bit address lines of the memory, said data switch normally providing a continuous drive current through one of the associated bit address lines during both the read or clear and the restore or write half-cycles of a memory cycle, storage means associated with said data switch for temporarily storing a binary digit to be stored in the memory, means responsive to a predetermined binary digit in said storage means for inhibiting said data switch from providing a drive current through the bit address line during the restore or clear half-cycle of a memory cycle.

2. The control system of claim 1 in which the predetermined binary digit is a binary 0.

3. The control system of claim 1 in which said last-named means comprises a transformer-coupled circuit.

4. The control system of claim 1 in which said storage means comprises a flip-flop.

5. A bit drive control system for a 2½D memory comprising:

a data switch associated with each group of bit address lines of the memory, said data switch normally providing a continuous drive current through one of the associated bit address lines during both the first and second half-cycles of a memory cycle, a flip-flop associated with said data switch for temporarily storing a binary digit to be stored in memory, means responsive to a binary 0 in said flip-flop for inhibiting said data switch from providing a drive current through the bit address line during the second half-cycle of a memory cycle.

6. A bit drive current control system for a 2½D memory comprising:

a data switch associated with each group of bit address lines of the memory, storage means associated with said data switch for temporarily storing a binary digit to be stored in the memory, said data switch comprising a first transistor, means for normally biasing said first transistor to a first conduction state, means responsive to storage of a binary 0 in said storage means for biasing said first transistor to a second conduction state during the restore or write half-cycle of a memory cycle, a second transistor, means for normally biasing said second transistor to a second conduction state, means responsive to the second conduction state of said second transistor for providing a drive current through one of the associated bit address lines during both the read or clear and the restore or write half-cycles of a memory cycle and responsive to the first conduction state of said second transistor for inhibiting drive current flow through the associated bit address line, and transformer coupling means responsive to the second conduction state of said first transistor for causing said second transistor to enter the first conduction state.

7. In a coincident current magnetic memory system including a plurality of magnetic storage elements with word address lines and groups of bit address lines for selectively applying drive currents to corresponding ones of the associated magnetic storage elements during the first and second half-cycles of a memory cycle, one word address line and corresponding ones of the bit address lines of the groups defining a word storage location in the memory system, each group of bit address lines corresponding to a different bit position of a word storage location, the combination comprising:

data switch means associated with each group of bit address lines, means connected to said data switch means for causing said data switch means to normally supply a continuous drive current to the associated group of bit address lines during both the first and second half-cycles of a memory cycle, and means connected to said data switch means for causing said data switch means to inhibit the drive current through the associated group of bit address lines during the second half-cycle of the memory cycle when a predetermined binary digit is to be stored in the corresponding bit position of the addressed word storage location.

References Cited

UNITED STATES PATENTS

| | | | |
|---|---|---|---|
| 2,857,586 | 10/1958 | Wylen | 340—174 |
| 3,001,710 | 9/1961 | Haynes | 235—160 |
| 3,060,410 | 10/1962 | Wanlass | 340—174 |
| 3,077,582 | 2/1963 | Bauer | 340—174 |

JAMES W. MOFFITT, Primary Examiner